US009331750B2

(12) United States Patent
Mach et al.

(10) Patent No.: US 9,331,750 B2
(45) Date of Patent: May 3, 2016

(54) WIRELESS POWER RECEIVER AND HOST CONTROL INTERFACE THEREOF

(71) Applicant: POWERMAT TECHNOLOGIES LTD., Neve Ilan (IL)

(72) Inventors: Elieser Mach, Rosh Tzurim (IL); Oz Moshkovich, Rehovot (IL); Itay Sherman, Hod Hsharon (IL)

(73) Assignee: POWERMAT TECHNOLOGIES LTD., Neve Ilan (IL)

( * ) Notice: Subject to any disclaimer, the term of this patent is extended or adjusted under 35 U.S.C. 154(b) by 0 days.

(21) Appl. No.: 14/665,762

(22) Filed: Mar. 23, 2015

(65) Prior Publication Data

US 2015/0195013 A1    Jul. 9, 2015

Related U.S. Application Data

(63) Continuation-in-part of application No. 14/311,849, filed on Jun. 23, 2014, which is a continuation of application No. PCT/IL2012/050544, filed on Dec. 20, 2012, application No. 14/665,762, which is a
(Continued)

(51) Int. Cl.
*H04B 7/00* (2006.01)
*H04B 5/00* (2006.01)
(Continued)

(52) U.S. Cl.
CPC .............. *H04B 5/0037* (2013.01); *H01F 38/14* (2013.01); *H02J 5/005* (2013.01); *H02J 7/025* (2013.01); *H04B 5/0031* (2013.01); *H04B 5/0081* (2013.01); *H01F 2038/143* (2013.01)

(58) Field of Classification Search
CPC .......... H04B 4/00; H04B 4/0012; H04B 4/02; H04W 84/18; H04W 88/06

USPC ....................... 455/41.1, 41.2, 41.3
See application file for complete search history.

(56) References Cited

U.S. PATENT DOCUMENTS 3,414,796 A    12/1968  Henquet
3,771,085 A    11/1973  Hojo et al.
(Continued)

FOREIGN PATENT DOCUMENTS

EP    0160990 A2    11/1985
EP    0160990 B1    1/1991
(Continued)

OTHER PUBLICATIONS

Liu et al. "An Analysis of Double-layer Electromagnetic Shield for a Universal Contactless Battery Charging Platform", IEEE 2005, p. 1767-1772.
(Continued)

*Primary Examiner* — April G Gonzales
(74) *Attorney, Agent, or Firm* — William Dippert; Laurence Greenberg; Werner Stemer

(57) ABSTRACT

A wireless power receiver, configured to receive power from a wireless power outlet and to communicate with a host for providing electrical power thereto, is provided comprising a secondary inductive coil configured to receive power from a primary coil of the wireless power outlet, and a host control interface configured to facilitate communication between the wireless power receiver and the host. The host control interface comprises contacts, one or more information-carrying contacts configured to conduct at least one of a clock and a data signal between the wireless power receiver and the host, supply input and power supply ground contacts configured to cooperate to provide current between the wireless power receiver and the host, an interrupt-signal contact configured to carry an INTERRUPT signal from the wireless power receiver and the host, and an enable-signal contact configured to carry an ENABLE signal from the host to the wireless power receiver.

20 Claims, 1 Drawing Sheet

Related U.S. Application Data continuation-in-part of application No. 12/883,457, filed on Sep. 16, 2010, which is a continuation of application No. PCT/IL2008/001641, filed on Dec. 18, 2008.

(60) Provisional application No. 61/969,159, filed on Mar. 23, 2014, provisional application No. 61/578,348, filed on Dec. 21, 2011, provisional application No. 61/598,697, filed on Feb. 14, 2012, provisional application No. 61/655,775, filed on Jun. 5, 2012, provisional application No. 61/673,844, filed on Jul. 20, 2012, provisional application No. 61/699,876, filed on Sep. 12, 2012, provisional application No. 61/064,618, filed on Mar. 17, 2008, provisional application No. 61/071,151, filed on Apr. 15, 2008, provisional application No. 61/129,526, filed on Jul. 2, 2008, provisional application No. 61/129,859, filed on Jul. 24, 2008, provisional application No. 61/129,970, filed on Aug. 4, 2008.

(51) Int. Cl.
*H02J 5/00* (2016.01)
*H01F 38/14* (2006.01)
*H02J 7/02* (2016.01)

(56) References Cited

U.S. PATENT DOCUMENTS

| | | |
|---|---|---|
| 3,938,018 A | 2/1976 | Dahl |
| 4,160,193 A | 7/1979 | Richmond |
| 4,349,814 A | 9/1982 | Akehurst |
| RE31,524 E | 2/1984 | Hoebel |
| 4,431,948 A | 2/1984 | Elder et al. |
| 4,580,062 A | 4/1986 | MacLaughlin |
| 4,754,180 A | 6/1988 | Kiedrowski |
| 4,977,515 A | 12/1990 | Rudden et al. |
| 5,221,877 A | 6/1993 | Falk |
| 5,278,771 A | 1/1994 | Nyenya |
| 5,367,242 A | 11/1994 | Hulman |
| 5,455,466 A | 10/1995 | Parks et al. |
| 5,455,467 A | 10/1995 | Young et al. |
| 5,486,394 A | 1/1996 | Stough |
| 5,528,113 A | 6/1996 | Boys et al. |
| 5,550,452 A | 8/1996 | Shirai et al. |
| 5,600,225 A | 2/1997 | Goto |
| 5,680,035 A | 10/1997 | Haim et al. |
| 5,713,939 A | 2/1998 | Nedungadi et al. |
| 5,734,254 A | 3/1998 | Stephens |
| 5,762,250 A | 6/1998 | Carlton et al. |
| 5,821,728 A | 10/1998 | Schwind |
| 5,821,731 A | 10/1998 | Kuki et al. |
| 5,907,285 A | 5/1999 | Toms et al. |
| 5,929,598 A | 7/1999 | Nakama et al. |
| 5,949,214 A | 9/1999 | Broussard et al. |
| 6,042,005 A | 3/2000 | Basile et al. |
| 6,127,799 A | 10/2000 | Krishnan |
| 6,211,649 B1 | 4/2001 | Matsuda |
| 6,230,029 B1 | 5/2001 | Hahn et al. |
| 6,396,935 B1 | 5/2002 | Makkonen |
| 6,436,299 B1 | 8/2002 | Baarman et al. |
| 6,441,589 B1 | 8/2002 | Frerking et al. |
| 6,484,260 B1 | 11/2002 | Scott et al. |
| 6,532,298 B1 | 3/2003 | Cambier et al. |
| 6,586,909 B1 | 7/2003 | Trepka |
| 6,624,616 B1 | 9/2003 | Frerking et al. |
| 6,644,557 B1 | 11/2003 | Jacobs |
| 6,673,250 B2 | 1/2004 | Kuennen et al. |
| 6,721,540 B1 | 4/2004 | Kayakawa |
| 6,731,071 B2 | 5/2004 | Baarman |
| 6,766,040 B1 | 7/2004 | Catalano et al. |
| 6,803,744 B1 | 10/2004 | Sabo |
| 6,825,620 B2 | 11/2004 | Kuennen et al. |
| 6,888,438 B2 | 5/2005 | Hui et al. |
| 6,894,457 B2 | 5/2005 | Germagian et al. |
| D519,275 S | 4/2006 | Shertzer |
| 7,043,060 B2 | 5/2006 | Quintana |
| 7,126,450 B2 | 10/2006 | Baarman et al. |
| 7,132,918 B2 | 11/2006 | Baarman et al. |
| 7,164,255 B2 | 1/2007 | Hui |
| 7,180,248 B2 | 2/2007 | Kuennen et al. |
| 7,180,265 B2 | 2/2007 | Naskali et al. |
| 7,224,086 B2 | 5/2007 | Germagian et al. |
| 7,233,319 B2 | 6/2007 | Johnson et al. |
| D553,852 S | 10/2007 | Brandenburg |
| 7,278,310 B1 | 10/2007 | Rice et al. |
| 7,385,357 B2 | 6/2008 | Kuennen et al. |
| 7,392,068 B2 | 6/2008 | Dayan et al. |
| 7,405,535 B2 | 7/2008 | Frerking et al. |
| 7,462,951 B1 | 12/2008 | Baarman |
| D586,809 S | 2/2009 | Jones et al. |
| 7,518,267 B2 | 4/2009 | Baarman |
| 7,522,878 B2 | 4/2009 | Baarman |
| 7,576,514 B2 | 8/2009 | Hui |
| D599,735 S | 9/2009 | Amidei et al. |
| D599,736 S | 9/2009 | Ferber et al. |
| D599,737 S | 9/2009 | Amidei et al. |
| D599,738 S | 9/2009 | Amidei et al. |
| D603,603 S | 11/2009 | Laine et al. |
| 7,612,528 B2 | 11/2009 | Baarman et al. |
| D607,879 S | 1/2010 | Ferber et al. |
| D611,407 S | 3/2010 | Webb |
| D611,408 S | 3/2010 | Ferber et al. |
| 8,049,370 B2 | 11/2011 | Azancot |
| 8,787,848 B2 * | 7/2014 | Kielb ............... G01D 21/00 455/115.1 |
| 8,847,571 B2 * | 9/2014 | Kielb ............... G05B 19/0423 323/224 |
| 2002/0057584 A1 | 5/2002 | Brockmann |
| 2002/0158512 A1 | 10/2002 | Mizutani et al. |
| 2003/0042740 A1* | 3/2003 | Holder ............... G06F 1/26 290/1 A |
| 2003/0210106 A1 | 11/2003 | Cheng et al. |
| 2004/0023633 A1 | 2/2004 | Gordon |
| 2004/0195767 A1 | 10/2004 | Randall |
| 2004/0203537 A1 | 10/2004 | Yoshida et al. |
| 2004/0242264 A1 | 12/2004 | Cho |
| 2004/0261802 A1 | 12/2004 | Griffin et al. |
| 2005/0007067 A1 | 1/2005 | Baarman et al. |
| 2005/0083020 A1 | 4/2005 | Baarman |
| 2005/0130593 A1 | 6/2005 | Michalak |
| 2005/0164636 A1 | 7/2005 | Palermo et al. |
| 2005/0169506 A1 | 8/2005 | Fenrich et al. |
| 2005/0174473 A1* | 8/2005 | Morgan ............... F21S 48/325 348/370 |
| 2005/0189910 A1 | 9/2005 | Hui |
| 2005/0192062 A1 | 9/2005 | Mickle et al. |
| 2005/0233768 A1 | 10/2005 | Guo et al. |
| 2006/0022214 A1* | 2/2006 | Morgan ............... F21K 9/00 257/99 |
| 2006/0028176 A1 | 2/2006 | Tang et al. |
| 2006/0043927 A1 | 3/2006 | Beart et al. |
| 2006/0052144 A1 | 3/2006 | Seil et al. |
| 2006/0061325 A1 | 3/2006 | Tang et al. |
| 2006/0071632 A1 | 4/2006 | Ghabra et al. |
| 2006/0091222 A1 | 5/2006 | Leung et al. |
| 2006/0093132 A1 | 5/2006 | Desormiere et al. |
| 2006/0202665 A1 | 9/2006 | Hsu |
| 2007/0023559 A1 | 2/2007 | Scapillato et al. |
| 2007/0057763 A1 | 3/2007 | Blattner et al. |
| 2007/0076459 A1 | 4/2007 | Limpkin |
| 2007/0103110 A1 | 5/2007 | Sagoo |
| 2007/0136593 A1 | 6/2007 | Plavcan et al. |
| 2007/0165371 A1 | 7/2007 | Brandenburg |
| 2007/0182367 A1 | 8/2007 | Partovi |
| 2007/0210889 A1 | 9/2007 | Baarman et al. |
| 2007/0279002 A1 | 12/2007 | Partovi |
| 2008/0001922 A1 | 1/2008 | Johnson et al. |
| 2008/0030985 A1 | 2/2008 | Joen et al. |
| 2008/0049988 A1 | 2/2008 | Basile et al. |
| 2008/0055047 A1 | 3/2008 | Osada et al. |
| 2008/0079388 A1 | 4/2008 | Sarnowsky et al. |

(56) References Cited

U.S. PATENT DOCUMENTS

| | | |
|---|---|---|
| 2008/0132293 A1 | 6/2008 | Gundlach et al. |
| 2008/0157715 A1 | 7/2008 | Rosenboom et al. |
| 2008/0223926 A1 | 9/2008 | Miller et al. |
| 2008/0258680 A1 | 10/2008 | Frerking et al. |
| 2008/0265835 A1 | 10/2008 | Reed et al. |
| 2009/0026959 A1 | 1/2009 | Lin et al. |
| 2009/0040807 A1 | 2/2009 | Doumae et al. |
| 2009/0047768 A1 | 2/2009 | Jain |
| 2009/0047769 A1 | 2/2009 | Bhat et al. |
| 2009/0075704 A1 | 3/2009 | Wang |
| 2009/0079387 A1 | 3/2009 | Jin et al. |
| 2009/0084705 A1 | 4/2009 | Justiss |
| 2009/0097221 A1 | 4/2009 | Sayed et al. |
| 2009/0102416 A1 | 4/2009 | Burley |
| 2009/0134972 A1 | 5/2009 | Wu, Jr. et al. |
| 2009/0146608 A1 | 6/2009 | Lee |
| 2009/0153098 A1 | 6/2009 | Toya et al. |
| 2009/0153297 A1 | 6/2009 | Gardner |
| 2009/0174263 A1 | 7/2009 | Baarman et al. |
| 2009/0203355 A1 | 8/2009 | Clark |
| 2009/0212639 A1 | 8/2009 | Johnson |
| 2009/0226050 A1 | 9/2009 | Hughes |
| 2009/0243791 A1 | 10/2009 | Partin et al. |
| 2009/0251102 A1 | 10/2009 | Hui |
| 2009/0273891 A1 | 11/2009 | Peiker |
| 2009/0278494 A1 | 11/2009 | Randall |
| 2010/0039066 A1 | 2/2010 | Yuan et al. |
| 2011/0036659 A1 | 2/2011 | Erjawetz et al. |
| 2011/0128694 A1 | 6/2011 | Saito |
| 2013/0043833 A1* | 2/2013 | Katz ............ H02J 7/025 320/108 |
| 2013/0285606 A1* | 10/2013 | Ben-Shalom ...... H01F 38/14 320/108 |
| 2014/0035521 A1* | 2/2014 | Endo ............. H02J 5/005 320/108 |
| 2014/0057575 A1* | 2/2014 | Ayukawa .......... G05F 1/10 455/73 |
| 2014/0142876 A1* | 5/2014 | John ............. H02J 5/005 702/60 |
| 2014/0176076 A1* | 6/2014 | Momo ........... H01M 10/46 320/128 |
| 2014/0184162 A1* | 7/2014 | Takahashi ....... H02J 7/007 320/128 |
| 2014/0184165 A1* | 7/2014 | Takahashi ..... H01M 10/486 320/134 |
| 2014/0184172 A1* | 7/2014 | Momo ........... H02J 7/0057 320/160 |
| 2014/0203661 A1* | 7/2014 | Dayan ........... H01F 38/14 307/104 |
| 2014/0302782 A1 | 10/2014 | Raab |
| 2014/0349572 A1* | 11/2014 | Ben-Shalom ..... H04B 5/0031 455/41.1 |

FOREIGN PATENT DOCUMENTS

| | | |
|---|---|---|
| EP | 0558316 A1 | 9/1993 |
| EP | 1220150 | 7/2002 |
| EP | 1990734 A1 | 11/2008 |
| GB | 2399466 A | 9/2004 |
| GB | 2399466 B | 11/2005 |
| GB | 2429372 A | 2/2007 |
| JP | 04-156242 | 5/1992 |
| JP | 07-039078 | 2/1995 |
| JP | 2001-309579 | 11/2001 |
| JP | 2005-006440 | 1/2005 |
| JP | 2005-110412 | 4/2005 |
| JP | 2006-102055 | 4/2006 |
| JP | 2007-529110 | 10/2007 |
| WO | 9602879 A1 | 2/1996 |
| WO | 0201557 A1 | 1/2002 |
| WO | 0215320 A1 | 2/2002 |
| WO | 2005041281 A1 | 5/2005 |
| WO | 2005043775 A1 | 5/2005 |
| WO | 2006015143 A2 | 2/2006 |
| WO | 2006037972 | 4/2006 |
| WO | 2008030985 A2 | 3/2008 |
| WO | 2008086080 A2 | 7/2008 |
| WO | 2008093334 A2 | 8/2008 |
| WO | 2008114268 A2 | 9/2008 |
| WO | 2009040807 A2 | 4/2009 |
| WO | 2009047768 A2 | 4/2009 |
| WO | 2009047769 A2 | 4/2009 |
| WO | 2009049657 A1 | 4/2009 |
| WO | 2009108958 A1 | 9/2009 |
| WO | 2010025156 A1 | 3/2010 |
| WO | 2010025157 A1 | 3/2010 |
| WO | 2011036659 | 3/2011 |

OTHER PUBLICATIONS

Hui et al. "A New Generation of Universal Contactless Battery Charging Platform for Portable Consumer Electronic Equipment", IEEE Transactions on Power Electronics May 2005, vol. 20, No. 3, p. 620-627.

Liu et al. "Equivalent Circuit Modeling of a Multilayer Planar Winding Array Structure for Use in a Universal Contactless Battery Charging Platform", IEEE Transactions on Power Electronics Jan. 2007, vol. 22, No. 1, p. 21-29.

Tang et al. "Evaluation of the Shielding Effects on Printed-Circuit-Board Transformers Using Ferrite Plates and Copper Sheets", IEEE Transactions on Power Electronics Nov. 2002, vol. 17, No. 6, p. 1080-1088.

Su et al. "Extended Theory on the Inductance Calculation of Planar Spiral Windings Including the Effect of Double-layer Electromagnetic Shield", IEEE 2007, p. 3022-3028.

Liu et al. "Optimal Design of a Hybrid Winding Structure for Planar Contactless Battery Charging Platform", IEEE Transactions on Power Electronics Jan. 2008, vol. 23, No. 1, p. 455-463.

Liu et al. "Simulation Study and Experimental Verification of a Universal Contactless Battery Charging Platform With Localized Charging Features", IEEE Transactions on Power Electronics Nov. 2007, vol. 22, No. 6, p. 2202-2210.

International Search Report for PCT/IL2009/000915 Completed by the European Patent Office on Mar. 15, 2010, 3 Pages.

Search report and Written Opinion for PCT/IL2008/001282, Both completed by the US Patent Office on Feb. 25, 2009, 9 pages all together.

Search Report and Written Opinion for PCT/IL2008/001347, Both completed by the US Patent Office on Feb. 2, 2009, 10 Pages all together.

Search Report and Written Opinion for PCT/IL2008/001348, Both completed by the US Patent Office on Jan. 28, 2009, 9 Pages all together.

International Search Report for PCT/IL2008/01641, Completed by the US Patents and Trademark Office on May 21, 2009, 3 Pages.

International Preliminary Report on Patentability mailed Sep. 21, 2010, for Corresponding Application PCT/IL2008/001641.

International Search Report for International Application No. PCT/IL2012/050544 dated Jun. 8, 2013.

Office Action dated Mar. 22, 2013, for Mexican Application MX/a/2011/003088.

Office Action dated Feb. 5, 2013, for Chinese Application 201110068458.7.

Office Action dated May 28, 2013, for Japanese Application 2010-526422.

Office Action dated May 28, 2013, for Japanese Application 2010-528526.

Office Action dated May 21, 2013, for Japanese Application 2011-500345.

* cited by examiner

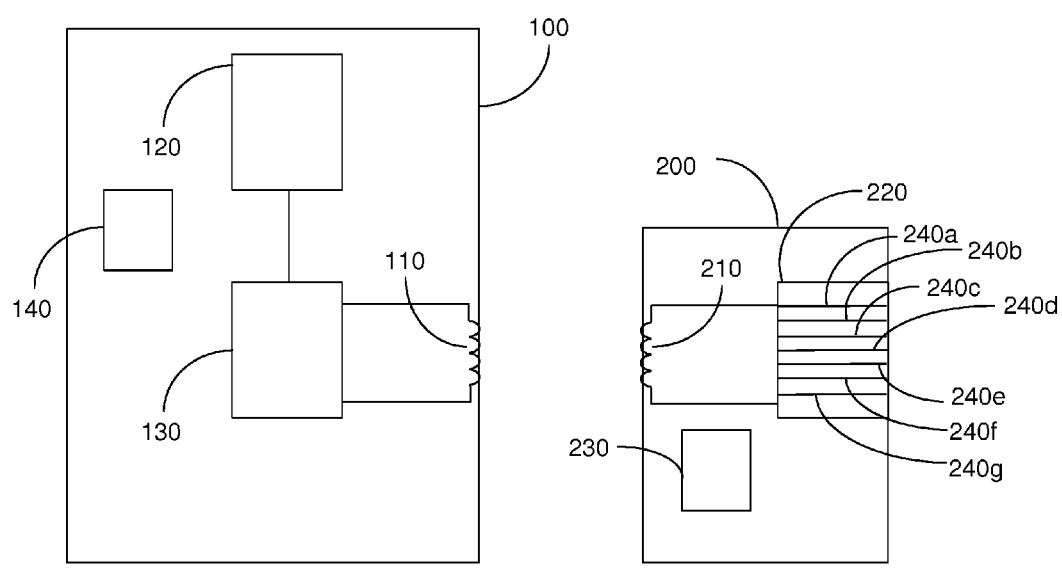

WIRELESS POWER RECEIVER AND HOST CONTROL INTERFACE THEREOF

CROSS-REFERENCE TO RELATED APPLICATIONS

This application claims the benefit of U.S. provisional Ser. No. 61/969,159 filed Mar. 23, 2014, and is also a continuation-in-part of U.S. Ser. No. 14/311,849 filed Jun. 23, 2014, which is a continuation of PCT application Serial No. PCT/IL2012/050544 filed Dec. 20, 2012 which claims the benefit of U.S. provisional Application Nos. 61/578,348 filed Dec. 21, 2011; 61/598,697 filed Feb. 14, 2012; 61/655,775 filed Jun. 5, 2012; 61/673,844 filed Jul. 20, 2012; and 61/699,876 filed Sep. 12, 2012, and itself is also a continuation-in-part of U.S. application Ser. No. 12/883,457 filed Sep. 16, 2010 which is a continuation of PCT application Serial No. PCT/IL2008/001641 filed Dec. 18, 2008, which claims the benefit of U.S. provisional application Ser. Nos. 61/064,618 filed Mar. 17, 2008; 61/071,151 filed Apr. 15, 2008; 61/129,526 filed Jul. 2, 2008; 61/129,859 filed Jul. 24, 2008; and 61/129,970 filed Aug. 4, 2008 the disclosures of which are incorporated by reference in their entirety herein.

TECHNICAL FIELD

The present disclosure relates to wireless power outlets, and to methods of transferring power thereby.

BACKGROUND

The use of a wireless non-contact system for the purposes of automatic identification or tracking of items is an increasingly important and popular functionality.

Inductive power coupling allows energy to be transferred from a power supply to an electric load without a wired connection therebetween. An oscillating electric potential is applied across a primary inductor. This sets up an oscillating magnetic field in the vicinity of the primary inductor. The oscillating magnetic field may induce a secondary oscillating electrical potential in a secondary inductor placed close to the primary inductor. In this way, electrical energy may be transmitted from the primary inductor to the secondary inductor by electromagnetic induction without a conductive connection between the inductors.

When electrical energy is transferred from a primary inductor to a secondary inductor, the inductors are said to be inductively coupled. An electric load wired in series with such a secondary inductor may draw energy from the power source wired to the primary inductor when the secondary inductor is inductively coupled thereto.

In order to take advantage of the convenience offered by inductive power coupling, inductive outlets having primary inductors may be installed in different locations that people typically use to rest their devices, such that they may be charged while at rest.

SUMMARY

According to one aspect of the presently disclosed subject matter, there is provided a wireless power receiver configured to receive power from a wireless power outlet and to communicate with a host for providing electrical power thereto, the wireless power receiver comprising: a secondary inductive coil configured to receive power from a primary coil associated with the wireless power outlet; and a host control interface configured to facilitate communication between the wireless power receiver and the host; wherein the host control interface comprises: one or more information-carrying contacts configured to conduct at least one of a clock and a data signal between the wireless power receiver and the host; a supply input contact and a power supply ground contact configured to cooperate to provide power between the wireless power receiver and the host; an interrupt-signal contact configured to carry an INTERRUPT signal from the wireless power receiver and the host; and an enable-signal contact configured to carry an ENABLE signal from the host to the wireless power receiver.

The host control interface may further comprise a secondary power contact configured to facilitate the host to provide electrical power to the wireless power receiver.

The wireless power receiver may further comprise a controller, wherein the secondary power contact is configured to supply electrical power thereto.

The information-carrying contacts may comprise: a clock signal contact configured to conduct a clock signal between the secondary unit and the host; and a data signal contact configured to conduct data signals between the secondary unit and the host.

The wireless power receiver may be configured to provide a regulated voltage to the host on the supply input and power supply ground contacts when the secondary coil forms an inductive couple with a primary coil of a wireless power outlet.

The wireless power receiver may be configured to provide a regulated voltage to the host on the supply input and power supply ground contacts when the secondary coil forms an inductive couple with a primary coil of a wireless power outlet.

The wireless power receiver may be configured to generate an INTERRUPT signal and transmit it to the host via the interrupt-signal contact.

The wireless power receiver may be configured to accept an ENABLE signal from the host via the enable-signal contact, and to modify its behavior based on the value of the ENABLE signal.

The wireless power receiver may further comprise a set of 16-bit internal registers, the wireless power receiver being configured to control its operation based on values stored in at least some of the registers.

The wireless power receiver may be configured to facilitate one or more of the following based on the values stored in the registers: the host querying the wireless power receiver for identification; the host setting operational parameters thereof; direct connection between the wireless power receiver and a battery of the host; communication between the wireless power receiver and the wireless power outlet via wireless charging coupling formed therebetween; bi-directional communication, via the wireless power receiver, between the wireless power outlet and the host; the wireless power receiver to operate as a wireless power outlet; host authentication; and upgrading of firmware associated with the wireless power receiver.

The registers may comprise one or more of the following: identification and capability registers; a general status register; receiver detectors configuration registers; a receiver to transmitter communication register; firmware upgrade registers; transmitter advertising register; a receiver capabilities register; receiver standard register; a receiver status register for read operation; a receiver status register for write operation; a receiver firmware status register for read access; a receiver firmware status register for write access; and a transmitter advertising register.

BRIEF DESCRIPTION OF THE DRAWINGS

For a better understanding of the embodiments and to show how it may be carried into effect, reference will now be made, purely by way of example, to the accompanying drawings.

With specific reference now to the drawings in detail, it is stressed that the particulars shown are by way of example and for purposes of illustrative discussion of selected embodiments only, and are presented in the cause of providing what is believed to be the most useful and readily understood description of the principles and conceptual aspects. In this regard, no attempt is made to show structural details in more detail than is necessary for a fundamental understanding; the description taken with the drawings making apparent to those skilled in the art how the several selected embodiments may be put into practice. In the accompanying drawings:

FIG. 1 is a schematic illustration of a wireless power outlet and a secondary unit according to the presently disclosed subject matter.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

As illustrated in FIG. 1, there is provided a wireless power outlet 100, such as an inductive power outlet, a resonant power outlet, or the like, constituting an inductive transmitter adapted to transmit electrical power wirelessly to a secondary unit 200 remote therefrom. The wireless power outlet 100 comprises a primary inductive coil 110 connected to a power source 120 via a driver 130. The driver 130 is configured to provide an oscillating driving voltage to the primary inductive coil 110. The wireless power outlet 100 may further comprise a controller 140, such as a microcontroller unit, to direct operation thereof.

The secondary unit 200 is configured to operate with an electronic device (referred to herein as a "host"), such as a mobile telephone, a computer, a tablet, etc., and constitutes an inductive receiver thereof. (Herein the specification and claims, the terms "receiver", "wireless receiver", "wireless power receiver", and "secondary unit" may be used interchangeably with one another.) It may be functionally connected thereto using any suitable arrangement. According to one non-limiting example, the secondary unit may be embedded in the host. According to another non-limiting example, the secondary unit 200 may be implemented on external hardware, such as a card or module, configured to interface with the host for providing electrical power thereto, such as described in the applicant's co-pending United States Patent Publication Number US 2014/0302782, which is incorporated herein by reference in its entirety.

The secondary unit 200 comprises a secondary inductive coil 210 configured to form an inductive couple with the primary inductive coil 110, thereby facilitating the secondary unit to draw power from the power source 120. The secondary unit 200 further comprises a host control interface (HCI) 220, configured to facilitate communication (e.g., power transfer, data transfer, etc.) between the secondary inductive coil 210 and components of the host, such as a power supply (e.g., a battery), host controller, etc. The secondary unit 200 further comprises a secondary controller 230, configured to direct operation thereof.

According to some non-limiting embodiments of the presently disclosed subject matter, the HCI 220 comprises seven electrical contacts 240a-240g (hereafter, when appropriate, indicated collectively by reference numeral 240) to permit communication between the secondary inductive coil 210 and the host. Each of the contacts 240 may terminate at a pin (not illustrated) at one or both sides, in order to facilitate physical connection thereof to a suitable portion of the host. Alternatively, the electrical contacts may each consist of a conducting line from the host to the HCI providing a conductive path therebetween.

According to some examples of the presently disclosed subject matter, the HCI may be configured to carry clock and/or data signals between the secondary unit 200 and the host. Accordingly, information-carrying contacts, e.g., a clock signal contact 240a (SCL contact) and a data signal contact 240b (SDA contact) may be provided. These contacts may be configured to facilitate communication, and especially clock and data signals, respectively, between the host and the secondary unit 200. The clock and/or data signals may conform to any suitable standard. For example, they may be compatible with NXP Semiconductor's Inter-Integrated Circuit protocol (hereafter referred to as "$I^2C$ protocol"), the specifications of which (published as "$I^2C$-Bus Specification and User Manual" and available on NXP Semiconductor's website) are incorporated herein by reference.

The clock signal contact 240a and/or the data signal contact 240b may further be configured to provide a communication channel from the secondary unit 200 to the host battery.

Pull-up resistors (not illustrated), for example connected to a power supply of the host, may be provided to weakly "pull" the signals from the secondary unit 200. The host and secondary unit may each be configured to actively pull signals to a low state for '0' state, and float a thereof bus for '1'.

The secondary unit 200 may be configured to serve as a slave under the standard to which it conforms. Alternatively, it may be configured to serve as a master, or selectively as either a master or a slave. For example, it may be configured to operate as a slave when communicating with the host, or as a master when communicating with the host's battery.

The HCI 220 may be provided to carry power signals between the host and the secondary unit 200. In order to facilitate this, the HCI 220 may comprise a power supply input contact 240c (VOUT) and a power supply ground contact 240d (GND) may be provided. Together, they are configured to cooperate to provide current between the host and the secondary unit 200. The secondary unit 200 may be configured to provide a regulated voltage on these contacts 240c, 240d whenever it forms an inductive couple with a suitable wireless power outlet 100, and is enabled by a control bus or a suitable control signal. The secondary unit 200 may be configured to decrease the voltage on these contacts 240c, 240d, for example by applying current limiting.

The secondary unit 200 may be configured to support optional generation of an INTERRUPT signal from it to the host. In order to facilitate this, the HCI 220 may comprise an interrupt-signal contact 240e (INT) to carry the INTERRUPT signal. The secondary receiver is configured to pull the INTERRUPT signal to zero to indicate that its status has changed, if generation thereof is enabled. The host may then use a transaction, e.g., supported by the standard to which it conforms, to query the secondary unit 200 for its exact status. The INTERRUPT signal may be cleared (i.e., returned to a logic '1' state) by the host when a status register returned by the secondary unit 200 is read.

The host may be configured to send an ENABLE signal to the secondary unit 200 to enable or disable (i.e., by pulling the signal to '0') charging. In order to facilitate this, the HCI 220 may comprise an enable-signal contact 240f (ENABLE). The secondary is configured to behave (e.g., to modify it behavior if necessary) in response to the ENABLE signal depending on its operational state (i.e., whether or not it forms an inductive couple (herein referred to as being "active with") with a suitable wireless power outlet 100) and on a host setting of a "terminate" register of the secondary unit, as follows:

If the secondary unit 200 is active with a suitable wireless power outlet 100, and the "terminate" register is set to '0', an ENABLE signal of '0' will result in the secondary unit disabling power output to host. Protocol exchanges with the wireless power outlet 100 may continue.

If the secondary unit 200 is active with a suitable wireless power outlet 100, and the "terminate" register is set to '1', an ENABLE signal of '0' will result in the secondary unit disabling power output to host. A suitable "end of charge" signal may be transmitted to the wireless power outlet 100.

If the secondary unit 200 is not active with a suitable wireless power outlet 100, an ENABLE signal of '0' will result in the secondary unit disabling signaling. It will not respond to any digital pings.

If the secondary unit 200 is active with a suitable wireless power outlet 100, irrespective of the setting of the "terminate" register, an ENABLE signal of '1' will result in the secondary unit enabling power outputs. Signaling may be active according to any suitable protocol.

If the secondary unit 200 is not active with a suitable wireless power outlet 100, an ENABLE signal of '1' will result in the secondary unit enabling signaling. It will respond to digital pings.

The host may be configured to supply electrical power to the secondary controller 230, e.g., when it is not drawing power from the wireless power outlet 100. In order to facilitate this, the HCI 220 may comprise an optional secondary power supply contact 240g (VCC contact). This may facilitate, e.g., the host to communicate with the secondary controller 230, for example to learn its capabilities.

It will be appreciated that as the secondary power supply contact 240g is optional, according to some non-limiting embodiments of the presently disclosed subject matter, the HCI 220 comprises six electrical contacts, i.e., a clock signal contact 240a, a data signal contact 240b, a power supply input contact 240c, a power supply ground contact 240d, an interrupt-signal contact 240e, and an enable-signal contact 240f, all as described above, mutatis mutandis.

The secondary unit 200 may be configured to communicate with the host using the contacts 240 as described above. Similarly, the host may be configured to communicate with the secondary unit 200 using the contacts are described above.

The host and secondary unit 200 may be co-configured to communicate with one another in a predefined way. For example, they may be co-configured to allow any one or more of the following: the host to query the secondary unit 200 for identification, including, but not limited to, the type of the secondary unit, its manufacture, and its model; the host to query the secondary unit 200 to query and set operational parameters thereof; direct connection between the secondary unit 200 and the battery of the host; communication between a wireless power outlet 100 and the secondary unit 200 via wireless charging coupling (e.g., an inductive couple) formed therebetween; bi-directional communication between a wireless power outlet 100 and the host to allow hosts to communicate via the secondary unit 200; the secondary unit 200 operating as a wireless power outlet; host authentication; and "Over the Air" (OTA) upgrading of firmware associated with the secondary unit 200, for example as installed on the secondary controller 230.

The host and secondary unit 200 may be configured to communicate with one another based on the $I^2C$ protocol, for example with the secondary unit operating as a slave as defined therein. According to examples wherein the secondary unit 200 is implemented on external hardware, it may use a memory address of 0×1010111. A hardware bus may be provided, operating at a speed not exceeding 400 kHz. 7-bit addressing mode and ACK bits may be enabled. The secondary unit 200 may use the Read and Write word protocol option of the $I^2C$ protocol.

The secondary unit 200 may comprise a set of 16-bit internal registers to control it. The registers may be read or written via transactions defined in the $I^2C$ protocol.

The host and/or secondary unit 200 may be configured to execute "write" operations according to the following: all bytes are sent from the master to the slave; and each write operation comprises a single transaction of 4 bytes, wherein: the first byte comprises the 7-bit address followed by a "read/write" bit set to "write"; the second byte comprises the register number to be written; and the third and fourth bytes comprise register data to be written, wherein the least significant byte is first.

The host and/or secondary unit 200 may be configured to execute "read" operations. For each "read" operation, two transactions take place according to the following: the first transactions is a "write" transaction of 2 bytes from the master to the slave, intended to set the pointer for the register to be read; it's structured as follows: the first byte comprises the 7-bit address followed by the "read/write" bit set to "write"; and the second byte comprises the register number to be read; the second transaction is a "read" transaction of 4 bytes, wherein the first byte is sent from the master to the slave, and the three following bytes are sent from the slave to the master; the structure of the three following bytes is as follows: the first byte includes the 7-bit address followed by the "read/write" bit set to "read"; and the second and third bytes are the register data with least significant byte first.

If a "read" operation needs to be repeated on the same register (e.g., polling of a register), the pointer does not need to be set again, as the pointer is already set. Similarly, if a register has been written using a "write" transaction, the same register may be read without the need to perform the pointer setting of the "write" transaction.

The "read" and "write" registers of the HCI 220 may comprise one or more of the following registers: identification and capability registers; a general status register; receiver detectors configuration registers; a receiver to transmitter communication register; firmware upgrade registers; transmitter advertising register; a receiver capabilities register; receiver standard register; a receiver status register for read operation; a receiver status register for write operation; a receiver firmware status register for read access; a receiver firmware status register for write access; and a transmitter advertising register.

The identification and capability registers may comprise the following registers, all of which may be "read" registers: a "receiver capabilities" register, e.g., at register number 0×01, which stores values relating to the capabilities of the receiver; a "receiver standard" register, e.g., at register number 0×02, which stores values relating to the standards supported by the receiver; "receiver manufactures code" registers, e.g., at registers number 0×03-0×04, which store values relating to the manufacturer code of the receiver; "receiver model number" registers, e.g., at registers number 0×05-0×06, which store values relating to the model number of the receiver; and "receiver serial number" registers, e.g., at registers number 0×07-0×0A, which store values relating to an ID of the receiver (e.g., RXID).

The general status register may comprise a "receiver status" register, e.g. at register number 0×10, which stores values relating to the status and control of the receiver function. It may be a "read/write" register.

The receiver detectors configuration registers may comprise the following registers, all of which may be "read/write" registers: an "over current protection" register, e.g., at register number 0×11, which stores values relating to settings of the over current protection (e.g., bits 0-7 may store the value of current in 10 mA units); an "over temperature protection" register, e.g., at register number 0×12, which stores values relating to settings of the over temperature protection (e.g., bits 0-6 may store the value of current in 1° C. units); a "secondary over temperature protection" register, e.g., at register number 0x13, which stores values relating to activation and setting of temperature and current threshold for secondary over temperature protection (e.g., bits 0-6 may store the value of current in 1° C. units, bits 7-14 may store the value of current in 10 mA units, and bit 15 may enable protection); a "receiver charge complete detection override" register, e.g., at register number 0'14, which stores values relating to override charge complete detector; and a "receiver terminate configuration" register, e.g., at register number 0×15, which stores values relating to controlling "end of charge" indications on disabling of the receiver.

The receiver to transmitter communication register may comprise a "receiver COM" register, e.g. at register number 0×1F, which stores values relating to access to 16 word FIFO of data received/transmitted from the transmitter host targeted to the receiver host. It may be a "read/write" register.

The firmware upgrade registers may comprise the following registers: a "receiver FW status" register, e.g., at register number 0×40, which stores values relating to status and control for receiver firmware upgrade (this may be a "read/write" register); and a "receiver FW COM" register, e.g., at register number 0×41, which stores values relating to access to a buffer containing new downloaded firmware image for the receiver (this may be a "write" register). The transmitter advertising register may comprise a "transmitter advertising" register, e.g. at register number 0×50, which stores values relating to advertising provided by transmitter during a digital ping phase. It may be a "read" register.

The firmware upgrade registers may comprise the following registers: a "receiver FW status" register, e.g., at register number 0x40, which stores values relating to status and control for receiver firmware upgrade (this may be a "read/write" register); and a "receiver FW COM" register, e.g., at register number 0×41, which stores values relating to access to a buffer containing new downloaded firmware image for the receiver (this may be a "write" register).

The bits of the receiver capabilities register, which may be a "read" register, may store values relating to different capabilities of the receiver, as follows: one bit (e.g., bit 10) may indicate a host authentication capability, i.e., the capability of the receiver to support host enhanced authentication; one bit (e.g., bit 9) may indicate a receiver authentication capability, i.e., the capability of the receiver to support receiver enhanced authentication; one bit (e.g., bit 5) may indicate a charger emulation capability, i.e., the capability of the receiver to support wall charger emulation connection (i.e., fixed voltage); one bit (e.g., bit 4) may indicate a direct-to-battery capability, i.e., the capability of the receiver to support a direct-to-battery connection; two bits (e.g., bits 3 and 2) may indicate a number-of-cells-selector capability, i.e., the number of Li-Ion cells the host advertises (only relevant for direct to battery operation); and two bits (e.g., bits 1 and 0) may indicate a receiver class, which may range from 1-3.

The remainder of the bits (according to the present example, bits 7, 8, and 11-15) of the receiver capabilities register may be reserved for future use.

The bits of the receiver standard register, which may be a "read" register, may store values relating to standards support of the receiver. One bit (e.g., bit '0') may indicate whether the receiver is compatible with the PMA standard "PMA Receiver Specification" published by the Power Matters Alliance, the full contents of which are incorporated herein by reference (hereafter, "PMA standard"; it will be appreciated that the term "PMA standard" includes any document which subsequently supersedes it). The remainder of the bits (according to the present example, bits 1-15) of the receiver standard register may be reserved for future use.

The bits of the receiver status register for read operation, which may be a "read" register, may store values relating to the status of the receiver for read operations, as follows: one bit (e.g., bit 15) may indicate whether or not interrupt is enabled; one bit (e.g., bit 14) may indicate whether or not charging is suspended due to an over-voltage condition being sensed; one bit (e.g., bit 13) may indicate whether or not charging is suspended due to an over-temperature condition being sensed; one bit (e.g., bit 12) may indicate whether or not charging is suspended due to an over-current condition being sensed; one bit (e.g., bit 11) may indicate whether or not charging current is reduced due to a secondary over-temperature condition being sensed; one bit (e.g., bit 10) may indicate whether or not there is data pending to the host, e.g., stored in the receiver COM register described above; one bit (e.g., bit 1) may indicate whether or not the receiver has detected a suitable and/or valid transmitter; and one bit (e.g., bit 0) may indicate whether or not the receiver is currently in active charging.

The remainder of the bits (according to the present example, bits 2-9) of the receiver status register for read operation may be reserved for future use.

The bits of the receiver status register for write operation, which may be a "write" register, may store values relating to the status of the receiver for write operations, as follows: one bit (e.g., bit 15) may enable (for example by setting ot a value of '1') interrupt creation on any change in the receiver statuses; and one bit (e.g., bit 0) may enable (for example by setting ot a value of '1') receiver charging.

The remainder of the bits (according to the present example, bits 1-14) of the receiver status register for write operation may be reserved for future use.

The bits of the receiver firmware status register for read access, which may be a "read" register, may be as follows: one bit (e.g., bit 15) may indicate whether an upgrading process of the firmware is ongoing; and one bit (e.g., bit 14) may indicate whether a firmware upgrade process has been completed successfully (after an unsuccessful upgrade process attempt, this bit may be reset when a new upgrade process is initiated); and twelve bits (e.g., bits 0 through 11) may indicate the last version of firmware that has been loaded to the receiver.

The remainder of the bits (according to the present example, bits 12 and 13) of the receiver firmware status register for read access may be reserved for future use.

The bits of the receiver firmware status register for write access, which may be a "write" register, may be as follows:

one bit (e.g., bit 15) may be used to start an upgrade process of the firmware (e.g., firmware written to the firmware buffer via the receiver FW COM register is flashed to memory); and one bit (e.g., bit 14) may return the write pointer for the input FW buffer to its start location; and twelve bits (e.g., bits 0 through 11) may indicate the version of firmware that will be reported on read (this value may be updated when a successful upgrade process is completed).

The remainder of the bits (according to the present example, bits 12 and 13) of the receiver firmware status register for write access may be reserved for future use.

The bits of the transmitter advertising register, which may be a "read" register, may be as follows: one bit (e.g., bit 15) may be set if transmitter advertising has been received from the transmitter that the receiver is currently engaged with (it may be cleared if receiver is not engaged with transmitter, or if the transmitter did not provide advertising during a digital ping phase); and twelve bits (e.g., bits 0 through 11) may comprise advertising information provided by the transmitter during a digital ping (the higher-numbered bits may represent the most significant bits).

The remainder of the bits (according to the present example, bits 12-14) of the transmitter advertising register may be reserved for future use.

Those skilled in the art to which this invention pertains will readily appreciate that numerous changes, variations and modifications can be made without departing from the scope of the invention mutatis mutandis.

Technical and scientific terms used herein should have the same meaning as commonly understood by one of ordinary skill in the art to which the disclosure pertains. Nevertheless, it is expected that during the life of a patent maturing from this application many relevant systems and methods will be developed. Accordingly, the scope of the terms such as computing unit, network, display, memory, server and the like are intended to include all such new technologies a priori.

The terms "comprises", "comprising", "includes", "including", "having" and their conjugates mean "including but not limited to" and indicate that the components listed are included, but not generally to the exclusion of other components. Such terms encompass the terms "consisting of" and "consisting essentially of".

The phrase "consisting essentially of" means that the composition or method may include additional ingredients and/or steps, but only if the additional ingredients and/or steps do not materially alter the basic and novel characteristics of the composition or method.

As used herein, the singular form "a", "an" and "the" may include plural references unless the context clearly dictates otherwise. For example, the term "a compound" or "at least one compound" may include a plurality of compounds, including mixtures thereof.

The word "optionally" is used herein to mean "is provided in some embodiments and not provided in other embodiments". Any particular embodiment of the disclosure may include a plurality of "optional" features unless such features conflict.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween. It should be understood, therefore, that the description in range format is merely for convenience and brevity and should not be construed as an inflexible limitation on the scope of the disclosure. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6 as well as non-integral intermediate values. This applies regardless of the breadth of the range.

It is appreciated that certain features of the disclosure, which are, for clarity, described in the context of separate embodiments, may also be provided in combination in a single embodiment. Conversely, various features of the disclosure, which are, for brevity, described in the context of a single embodiment, may also be provided separately or in any suitable subcombination or as suitable in any other described embodiment of the disclosure. Certain features described in the context of various embodiments are not to be considered essential features of those embodiments, unless the embodiment is inoperative without those elements.

Although the disclosure has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the disclosure.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present disclosure. To the extent that section headings are used, they should not be construed as necessarily limiting.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A wireless power receiver configured to receive power from a wireless power outlet and to communicate with a host for providing electrical power thereto, said wireless power receiver comprising:
   a secondary coil configured to receive power from a primary coil associated with said wireless power outlet; and
   a host control interface configured to facilitate communication between said wireless power receiver and said host;
   wherein said host control interface comprises:
   one or more information-carrying contacts configured to conduct at least one of a clock signal or a data signal between said wireless power receiver and the host;
   a supply input contact and a power supply ground contact configured to cooperate to provide power between said wireless power receiver and the host;
   an interrupt-signal contact configured to carry an INTERRUPT signal from said wireless power receiver and the host; and an enable-signal contact configured to carry an ENABLE signal from said host to the wireless power receiver; and wherein said wireless power receiver is configured to facilitate one or more of the following based on values stored in a asset of 16-bit internal registers:

the host querying the wireless power receiver for identification;

the host setting operational parameters thereof;

direct connection between the wireless power receiver and a battery of the host;

communication between the wireless power receiver and the wireless power outlet via wireless charging coupling formed therebetween;

bi-directional communication, via the wireless power receiver, between the wireless power outlet and said host;

the wireless power receiver to operate as a wireless power outlet;

host authentication; and upgrading of firmware associated with the wireless power receiver.

2. The wireless power receiver according to claim 1, wherein said host control interface further comprises a secondary power contact configured to facilitate said host to provide electrical power to the wireless power receiver.

3. The wireless power receiver according to claim 2, further comprising a controller, wherein said secondary power contact is configured to supply electrical power thereto.

4. The wireless power receiver according to claim 1, wherein said information-carrying contacts comprise:

a clock signal contact configured to conduct a clock signal between said secondary unit and the host; and a data signal contact configured to conduct data signals between said secondary unit and the host.

5. The wireless power receiver according to claim 1, being configured to provide a regulated voltage to said host on said supply input and power supply ground contacts when said secondary coil forms an inductive couple with the primary coil of the wireless power outlet.

6. The wireless power receiver according to claim 1, being configured to generate an INTERRUPT signal and transmit it to the host via said interrupt-signal contact.

7. The wireless power receiver according to claim 1, being configured to accept an ENABLE signal from said host via said enable-signal contact, and to modify its behavior based on the value of the ENABLE signal.

8. The wireless power receiver according to claim 1, wherein said information-carrying contacts comprise said interrupt-signal contact.

9. The wireless power receiver according to claim 1, wherein said information-carrying contacts comprise said enable-signal contact.

10. The wireless power receiver according to claim 1, wherein said information-carrying contacts comprise supply input contact.

11. The wireless power receiver according to claim 1, wherein said supply input contact and said power supply ground contact are configured to cooperate to provide power between said wireless power receiver and the host.

12. The wireless power receiver according to claim 1, wherein said registers comprise one or more of the following: identification and capability registers; a general status register; receiver detectors configuration registers; a receiver to transmitter communication register; firmware upgrade registers; transmitter advertising register; a receiver capabilities register; receiver standard register; a receiver status register for read operation; receiver status register for write operation; a receiver firmware status register for read access; a receiver firmware status register for write access; and a transmitter advertising register.

13. A wireless power receiver configured to receive power from a wireless power outlet and to communicate with a host for providing electrical power thereto, said wireless power receiver comprising:

a secondary coil configured to receive power from a primary coil associated with said wireless power outlet; and a host control interface configured to facilitate communication between said wireless power receiver and said host, said host control interface comprises one or more information-carrying contacts configured to conduct at least one signal between said wireless power receiver and the host, the signal selected from a group consisting of a clock signal, a data signal, an INTERRUPT signal and an ENABLE signal; and wherein said wireless power receiver is configured to facilitate the host querying the wireless power receiver for identification based on values stored in a set of at least 16-bit internal registers.

14. A wireless power receiver configured to receive power from a wireless power outlet and to communicate with a host for providing electrical power thereto, said wireless power receiver comprising:

a secondary coil configured to receive power from a primary coil associated with said wireless power outlet; and power receiver and the host, the signal selected from a group consisting of a clock signal, a data signal, an INTERRUPT signal and an ENABLE signal; and wherein said wireless power receiver is configured to facilitate upgrading of firmware associated with the wireless power receiver based on values stored in a set of at least 16-bit internal registers.

15. A wireless power receiver configured to receive power from a wireless power outlet and to communicate with a host for providing electrical power thereto, said wireless power receiver comprising:

a secondary coil configured to receive power from a primary coil associated with said wireless power outlet; and a host control interface configured to facilitate communication between said wireless power receiver and said host, said host control interface comprises one or more information-carrying contacts configured to conduct at least one signal between said wireless power receiver and the host, the signal selected from a group consisting of a clock signal, a data signal, an INTERRUPT signal and an ENABLE signal; and wherein said wireless power receiver is configured to facilitate direct connection between the wireless power receiver and a battery of the host based on values stored in a set of at least 16-bit internal registers.

16. A wireless power receiver configured to receive power from a wireless power outlet and to communicate with a host for providing electrical power thereto, said wireless power receiver comprising:

a secondary coil configured to receive power from a primary coil associated with said wireless power outlet; and a host control interface configured to facilitate communication between said wireless power receiver and said host, said host control interface comprises one or more information-carrying contacts configured to conduct at least one signal between said wireless wherein said wireless power receiver is configured to facilitate bi-directional communication, via the wireless power receiver, between the wireless power outlet and said host based on values stored in a set of at least 16-bit internal registers.

17. A wireless power receiver configured to receive power from a wireless power outlet and to communicate with a host for providing electrical power thereto, said wireless power receiver comprising:
- a secondary coil configured to receive power from a primary coil associated with said wireless power outlet; and
- a host control interface configured to facilitate communication between said wireless power receiver and said host, said host control interface comprises one or more information-carrying contacts configured to conduct at least one signal between said wireless power receiver and the host, the signal selected from a group consisting of a clock signal, a data signal, an INTERRUPT signal and an ENABLE signal; and
- wherein said wireless power receiver is configured to facilitate communication between the wireless power receiver and the wireless power outlet via wireless charging coupling formed therebetween based on values stored in a set of at least 16-bit internal registers.

18. A wireless power receiver configured to receive power from a wireless power outlet and to communicate with a host for providing electrical power thereto, said wireless power receiver comprising:
- a secondary coil configured to receive power from a primary coil associated with said wireless power outlet; and
- a host control interface configured to facilitate communication between said wireless power receiver and said host, said host control interface comprises one or more information-carrying contacts configured to conduct at least one signal between said wireless power receiver and the host, the signal selected from a group consisting of a clock signal, a data signal, an INTERRUPT signal and an ENABLE signal; and
- a host control interface configured to facilitate communication between said wireless power receiver and said host, said host control interface comprises one or more information-carrying contacts configured to conduct at least one signal between said wireless power receiver and the host, the signal selected from a group consisting of a clock signal, a data signal, an INTERRUPT signal and an ENABLE signal; and
- wherein said wireless power receiver is configured to facilitate the host setting operational parameters thereof based on values stored in a set of at least 16-bit internal registers.

19. A wireless power receiver configured to receive power from a wireless power outlet and to communicate with a host for providing electrical power thereto, said wireless power receiver comprising:
- a secondary coil configured to receive power from a primary coil associated with said wireless power outlet; and
- a host control interface configured to facilitate communication between said wireless power receiver and said host, said host control interface comprises one or more information-carrying contacts configured to conduct at least one signal between said wireless power receiver and the host, the signal selected from a group consisting of a clock signal, a data signal, an INTERRUPT signal and an ENABLE signal; and
- wherein said wireless power receiver is configured to facilitate the wireless power receiver to operate as a wireless power outlet based on values stored in a set of at least 16-bit internal registers.

20. A wireless power receiver configured to receive power from a wireless power outlet and to communicate with a host for providing electrical power thereto, said wireless power receiver comprising:
- a secondary coil configured to receive power from a primary coil associated with said wireless power outlet; and
- a host control interface configured to facilitate communication between said wireless power receiver and said host, said host control interface comprises one or more information-carrying contacts configured to conduct at least one signal between said wireless power receiver and the host, the signal selected from a group consisting of a clock signal, a data signal, an INTERRUPT signal and an ENABLE signal; and
- wherein said wireless power receiver is configured to facilitate the host authentication based on values stored in a set of at least 16-bit internal registers.

* * * * *